US010100572B2

(12) United States Patent
Pesce et al.

(10) Patent No.: US 10,100,572 B2
(45) Date of Patent: Oct. 16, 2018

(54) INSULATING GLAZING

(75) Inventors: Lorenzo Pesce, Brussels (BE); Eric Tixhon, Crisnee (BE)

(73) Assignee: AGC Glass Europe, Brussels (BE)

( * ) Notice: Subject to any disclaimer, the term of this patent is extended or adjusted under 35 U.S.C. 154(b) by 405 days.

(21) Appl. No.: 13/805,470

(22) PCT Filed: Jun. 23, 2011

(86) PCT No.: PCT/EP2011/060530
§ 371 (c)(1),
(2), (4) Date: Dec. 19, 2012

(87) PCT Pub. No.: WO2011/161205
PCT Pub. Date: Dec. 29, 2011

(65) Prior Publication Data
US 2013/0089684 A1 Apr. 11, 2013

(30) Foreign Application Priority Data
Jun. 24, 2010 (BE) .................................. 2010/0376

(51) Int. Cl.
*E06B 3/67* (2006.01)
*C03C 17/245* (2006.01)
(Continued)

(52) U.S. Cl.
CPC .......... *E06B 3/6715* (2013.01); *C03C 17/245* (2013.01); *C03C 17/3417* (2013.01);
(Continued)

(58) Field of Classification Search
CPC ............... C03C 17/245; C03C 17/3417; Y10T 428/265
(Continued)

(56) References Cited

U.S. PATENT DOCUMENTS

2003/0066825 A1   4/2003  Leutner et al.
2004/0253471 A1*  12/2004 Thiel ...................... B32B 17/06
                                                         428/544
(Continued)

FOREIGN PATENT DOCUMENTS

EP      0 637 572      2/1995
EP      1 285 894      2/2003
(Continued)

OTHER PUBLICATIONS

"Method of manufacture of transparent heat-reflecting doped tin dioxide on glass," Chemical Abstracts, vol. 107, No. 24, Total 1 Page, (Dec. 1987) XP 002171526.
International Search Report dated Sep. 21, 2011 in PCT/EP11/060530 Filed Jun. 23, 2011.

*Primary Examiner* — Amber R Orlando
*Assistant Examiner* — Lawrence Ferguson
(74) *Attorney, Agent, or Firm* — Oblon, McClelland, Maier & Neustadt, L.L.P.

(57) ABSTRACT

The invention relates to triple glazing comprising at least one glass sheet that has a system of layers on one side which are produced using sputtering and include at least one metal layer that reflects infrared radiation. The at least one glass sheet has a set of low-emission layers on the other side, said set of layers comprising one or more oxide layers that are deposited using gas phase pyrolysis. The disclosed glazing has a minimum light transmittance of 60 percent (standard EN 410, illuminant D65 at 2°) with 4 mm thick glass sheets.

20 Claims, 1 Drawing Sheet

(51) Int. Cl.
  *C03C 17/34* (2006.01)
  *C03C 17/36* (2006.01)
  *E04B 1/78* (2006.01)
  *E06B 3/66* (2006.01)
(52) U.S. Cl.
  CPC ............ *C03C 17/36* (2013.01); *C03C 17/366* (2013.01); *C03C 17/3644* (2013.01); *E04B 1/78* (2013.01); *E06B 3/66* (2013.01); *E06B 3/6608* (2013.01); *C03C 2217/241* (2013.01); *C03C 2217/244* (2013.01); *C03C 2218/365* (2013.01); *Y10T 428/265* (2015.01)
(58) Field of Classification Search
  USPC ........................................................ 428/220
  See application file for complete search history.

(56) References Cited

U.S. PATENT DOCUMENTS

| | | | |
|---|---|---|---|
| 2005/0252108 | A1 | 11/2005 | Sanderson et al. |
| 2006/0188730 | A1* | 8/2006 | Varanasi et al. .............. 428/432 |
| 2008/0128071 | A1 | 6/2008 | Murphy |
| 2009/0197097 | A1* | 8/2009 | Medwick ................ B32B 17/06 |
| | | | 428/432 |

FOREIGN PATENT DOCUMENTS

| | | |
|---|---|---|
| EP | 1 293 726 | 3/2003 |
| WO | 01 28949 | 4/2001 |
| WO | 03 050056 | 6/2003 |

* cited by examiner

INSULATING GLAZING

The present invention relates to glazings that have thermally insulating properties. The invention relates in particular to glazings for which the properties are linked to the presence of transparent thin layers that act as selective filters for the wavelengths transmitted.

The production of glazings that offer low-emissivity properties constitutes a significant part of the improvements that target the reduction of the energy consumption for the heating of buildings. Using several glass sheets is one means of improving their performances. The use of triple glazings, that is to say glazings comprising three glass sheets separated from one another, a gas-filled cavity separating these sheets, is one well-known means for resulting in very high insulation. In practice, increasing the number of the glass sheets is limited by considerations linked to the weight and size of the glazings in question. For this reason, the improvement of the performances of the insulating triple glazings requires the use of layers that reduce the energy transmission by partly serving as a barrier at least to thermal radiation.

Triple glazings comprising systems of low-emissivity layers are well known from the prior art. The systems of layers used are essentially systems comprising thin metal layers that selectively reflect infrared rays. The layers are of the type deposited by sputtering. These layers have the advantage of resulting in an intense and selective reflection of the infrared rays, letting through to a very large extent the visible wavelengths. A choice of dielectric layers completes the filters in question. The purpose of these dielectric layers is, on the one hand, to protect the thin metal layers and, on the other hand, to improve the selectivity such that the glazings in question offer a practically neutral color in reflection.

Apart from the systems of layers deposited by sputtering and comprising infrared-reflecting metal layers, other types may impart properties of the same nature to the glazings. These are mainly oxide layers deposited by pyrolysis techniques. The pyrolytic layers have the advantage of being obtained directly on the float glass production lines. The cost of these layers is much lower than that of the systems of layers deposited by sputtering. Furthermore, the pyrolytic layers are relatively "hard". They offer a good resistance to mechanical and/or chemical testing. However, these layers have performances as far as emissivity is concerned that remain much lower than those comprising reflective metal layers deposited by sputtering. Their use takes into account these distinctive characteristics, and the glazings having the highest-performing properties therefore essentially comprise systems comprising reflective metal layers.

In this type of structure, triple glazings comprising a set of two systems of low-emissivity layers are commercially available. In a triple glazing, the two systems of IR-reflecting layers are especially located in positions 2 and 5 according to the standard terminology in this field. The positions in question are numbered starting from the face of the glass sheet in contact with the outside. The faces go from position 1 to position 6, the latter being that turned toward the interior space of the building.

In these commercialized products, the choice of the position of the systems of layers is determined as a function of several considerations.

Firstly, it is necessary to protect the layers against possible deteriorations due to their brittleness, especially with respect to mechanical abrasions. The layers formed by sputtering are not very strong; introducing them into the spaces located between the glass sheets protects them from a deterioration of this type.

Secondly, of the three glass sheets the median sheet is normally free of layers that have a filter function in order to prevent risks linked to the thermal stresses that could develop therein. Positions 3 and 4 are not therefore suitable for the placement of low-emissivity layers.

The commercialized glazings comprise layers at positions 2 and 5 as indicated in the comparative examples described later.

The triple glazings thus formed are already very high-performing, nevertheless any improvements that make it possible to further improve energy savings are desired. Improvements linked to the use of insulating triple glazings are no exception.

Systematic developments are undertaken in order to improve the performances of the systems of layers. In particular, in systems comprising reflective metal layers, increasing the number of metal layers and the number of dielectric layers that accompany them makes it possible to improve the insulation performances. This result is obtained with systems that have the drawback of being substantially more expensive. For this reason, even in triple glazings, the most common development remains the use of relatively simple system that only comprise one IR-reflecting metal layer.

On these bases, the possibility of improving the insulating properties of triple glazings nevertheless remains a permanent objective.

At the same time, the products considered must still satisfy a certain number of requirements. In particular, the reduction of the emissivity must not significantly alter the other properties. The glazings must retain a light transmission that is as high as possible and must not have an unacceptable color in reflection. By way of indication, the glazings must have a reflection that is as neutral as possible and above all must not have a purple coloration.

The inventors have shown under these conditions that a substantial improvement in the performances could be obtained by using glazings as defined in claim 1.

The choice of positioning, on one and the same glass sheet, a system of layers deposited by sputtering on one face and a pyrolytic layer on the other face surprisingly shows that it is possible to further improve the thermal insulation coefficient U.

It is also necessary to emphasize that the implementation of the invention requires methods that are not customary for the glass sheets comprising one or the other of these systems of layers.

Glass sheets, one face of which is coated with a system of layers obtained by pyrolysis, the other with a system of layers obtained by sputtering, have been proposed previously. These glass sheets were intended to be incorporated into the composition of domestic-use oven doors. In these applications, the sheets in question were part of a set comprising, for example, three glass sheets, at least one of which had this structure. In these applications, the essential property is of course to screen out infrared radiation. The light transmission, without being negligible, may be brought back to relatively modest values, for example of less than 50%. Likewise, the optical quality of these products is not comparable to that required in architectural glazings. In particular the amount of haze that corresponds to a fraction of the diffused light may be significantly greater for these applications. Likewise again, the colors in reflection are often reduced by the use, for the outermost glass sheet with respect to the oven, of a highly colored glass.

For these reasons, the properties required for these applications are not very restricting and the preparation techniques may follow relatively conventional methods.

In contrast to these prior propositions, the glazings according to the invention offer a light transmission which remains high and is not less than 60% (measured according to the EN 410 Standard for an illuminant D65 under an angle of 2°) for clear glazings, the sheets of which have a thickness of 4 mm. The optional use of glazings comprising sheets of "extra-clear" glass inevitably results in the increase of this light transmission in the proportions particular to this type of glass. Still with respect to the prior techniques, the glazings according to the invention must have a haze that is as reduced as possible and in all cases must not be greater than 0.7% and preferably not greater than 0.5%. The measurements of the haze are made for example according to the provisions of the ASTM D1003-92 standard.

Remarkably, in the insulating triple glazings according to the invention, the two systems of layers must be located on either side of the same glass sheet. This also results, for the reasons of relative strength of these systems of layers, in positioning the pyrolytic layers on an outer face of the double glazing, the layers obtained by sputtering thus being turned toward the space located between the glass sheets.

The set of pyrolytic layers is obtained conventionally in the installations for producing "float" glass, by applying the precursors of these layers directly to the ribbon of glass at high temperature.

Once the pyrolytic set is formed, the ribbon of glass is cut and the sheets are treated "off-line" in sputtering installations. In these operations, the sheet to be coated rests on a roller table as it progresses under the various cathodes used to form the various layers. The face in contact with the rollers is the one previously coated by pyrolysis. Despite its relative hardness, the contact of the layer with the rollers is capable of imprinting rubbing marks on this layer, the surface of which is relatively rough. These marks once again are of no great importance for "oven" applications. They are not acceptable for architectural glazings.

The pyrolytic layers, due to the very fact of their surface roughness, also ordinarily have a not inconsiderable haze. In order to attenuate these surface irregularities, it is known to carry out a polishing of these layers. From experience, the use of such polishing makes it possible, according to the invention, to remove most of the roughness that is the source of the rubbing marks during the transportation operation in the sputtering deposition installations.

According to the invention, it is therefore desirable, once the pyrolytic layer is formed, and preferably before carrying out the deposition by sputtering, to subject each layer to the polishing in question. The polishing of the pyrolytic layer is advantageously such that the roughness Ra after polishing is not greater than 10 nm and preferably not greater than 6 nm.

In practice, the polishing substantially reduces the haze introduced by the presence of the pyrolytic layer. Initially, depending on the pyrolytic layers considered, this haze lies approximately between 0.4% and 0.8% of the transmitted light. It is commonly acknowledged that glazings for architectural applications must not have a haze greater than 0.7%. The polishing carried out under known conditions makes it possible to reduce the haze preferably to a value less than or equal to 0.5% and preferably less than or equal to 0.3%.

In order to arrive at the best performances, it is necessary in the glazings according to the invention to simultaneously use the best pyrolytic layers and the best layers deposited by sputtering. For the pyrolytic layers, use is advantageously made of a layer based on doped tin oxide. As is known, the dopant is either fluorine or antimony.

Still as is known, the layer of doped tin oxide must have a certain thickness. This thickness guarantees a selective action on infrared radiation while making it possible to maintain a good neutrality of color. This thickness is at least 200 nm, but the neutrality is at best only for discrete thicknesses which may vary as a function of the exact nature of the composition of these layers.

In order to improve, in particular, the neutrality in reflection of the pyrolytic layers and favor the light transmission, it is known to combine with the layer constituting the infrared filter, at least one other layer located under the first, having an index intermediate between that of the glass substrate and the layer that selectively filters infrared radiation. These layers favor, in particular, the neutralization and the suppression of color variations depending on the angle of observation. Known conventional layers consist of oxides, of silicon oxide SiOx, of silicon oxycarbide SiOxCy, or of combinations of layers of oxides, in particular of sets of layers of titanium oxide and of silicon oxide, or of tin oxide and silicon oxide. These layers, or sets of layers, are also produced by direct pyrolysis on the ribbon of glass in float glass installations or at the outlet thereof.

The best arrangements regarding the pyrolytic layers, such as those indicated above, result for these systems in emissivity values that, for an application on a sheet of clear float glass having a thickness of 4 mm, are not greater than 0.20 and preferably not greater than 0.15, and particularly advantageously are less than or equal to 0.10.

Although the forming of the pyrolytic layer imposes some precautions, the same is true as regards the layers formed by sputtering. In particular, the face of the glass on which the deposition is carried out is inevitably that in contact with the tin bath in the manufacture of the glass sheet. It is known that this face is capable of reacting with the layers deposited. Diffusions may take place that adversely affect the quality of the layers in question. For this reason, when a single system of layers is present on a glass sheet, it is endeavored to carry out the deposition on the "air" face of the glass sheet.

For the sheets according to the invention, the only face available for the deposition is the "tin" face. It is therefore preferable for the system of layers deposited to be protected against possible impairment due to undesirable diffusions. Advantageously, this protection is provided by means of layers interposed between the infrared-reflecting metal layer and the glass sheet. Protective layers are, for example, layers based on $SiO_2$, $Si_3N_4$, or any other layer known for this type of property, in particular layers based on tin oxide or on oxides of a zinc/tin alloy.

As indicated above, it is necessary to form a set by sputtering which is as high-performance as possible as regards emissivity without requiring the use of expensive systems. In particular, it is preferred, for the latter reason especially, to use a system of layers that comprises only a single metal layer, especially a silver-based layer. When a single silver-based layer is present in these systems, this layer has a thickness which is from 10 to 16 nm.

The choice of the systems of layers obtained by sputtering which are simultaneously neutral in reflection and have the best emissivities, makes it possible to achieve emissivities less than or equal to 0.01. These systems are very substantially more effective than the pyrolytic systems mentioned above.

The combination of the systems of layers according to the invention makes it possible to achieve particularly low thermal coefficient values which had not been previously achieved with such triple glazings. The classifications of glazings which are the subject of standards and are based on the values of the U coefficients make it possible to cross thresholds that were hitherto inaccessible for the glazings of the type considered. Thus, for a glazing composed of three glass sheets having a thickness of 4 mm each, separated by 16 mm, the space being filled with a gas mixture comprising 90% argon, the U coefficients achieved according to the invention may be equal to 0.5 W/m$^2$·K (EN 673 standard). Generally, the triple glazings according to the invention have a U coefficient that is not greater than 0.70 w/m$^2$·K.

The choice of the nature of the layers and of their thicknesses is such that the glazings according to the invention have in reflection colorimetric coordinates in the CIELAB system that are advantageously such that:

$-6 \leq a^* \leq 3$ $-6 \leq b^* \leq 3$.

The invention is described in detail by referring to the page of drawings in which.

Figure 1:
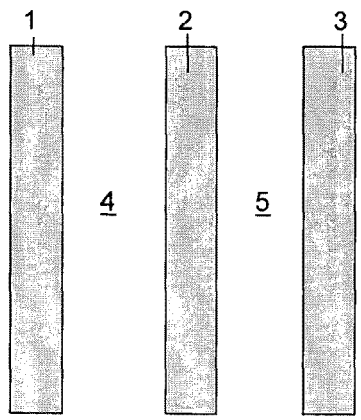
FIG. 1 is a schematic cross-sectional view representing an insulating triple glazing from the prior art.
Figure 2:
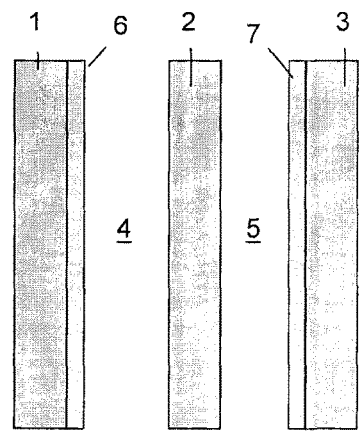
FIG. 2 is a view of another prior form comprising two systems of infrared-reflecting layers.

The most common insulating triple glazings at the present time are of the type represented in FIG. 1 and in FIG. 2. They consist of three glass sheets (1, 2, 3) that trap between them, in enclosed spaces, gas-filled cavities (4, 5), most frequently filled with argon chosen for its low thermal conductivity coefficient. The faces of the glass sheets are conventionally numbered beginning with that turned toward the outside of the building.

The glazing from FIG. 1 does not comprise any low-emissivity system. That from FIG. 2 comprises two systems of low-emissivity layers (6, 7) respectively applied at positions 2 and 5. These systems usually consist of a set comprising a thin metal layer, most often based on silver, this layer being within a set of dielectric layers that protects the metal layer. The metal layer selectively reflects infrared radiation. The dielectric layers protect the metal layer against various degradations originating, for example, from diffusion of ions from the glass sheet, or of oxygen at the time of the production of the layers superposed on the metal layer or else subsequent to this production. The dielectric layers also have the role of limiting the reflection of the rays of visible wavelengths, and of maintaining a neutrality of color in reflection.

The highest performing systems of layers for the low-emissivity properties are of the type deposited by sputtering. These systems that are sensitive to mechanical attacks are positioned in the spaces located between the glass sheets.

The low-emissivity systems may also comprise several reflective metal layers. The gain in terms of low-emissivity properties is relatively limited with respect to the best single-layer systems. The benefit of the plurality of metal layers lies essentially in a better control of the reflection of visible wavelengths, and consequently of the neutrality in reflection.

Conventional insulating glazings under optimized conditions have, for example, systems of layers such as those described in the publication WO 2009/097513, and especially those having the structure:

glass/TiO$_2$/ZrO$_2$/ZnO/Ag/TiOx/ZnO/SnO$_2$.

The emissivity of these systems depends in particular on the thickness of the silver layer. The thicker this layer is, the lower the emissivity. The increase of the thickness of the silver layer does not however have only advantages, independently of the cost of this layer. By increasing the layer, the color in reflection and optionally the light transmission are modified at the same time. In order to obtain the best compromise it is sometimes necessary to maintain the thickness at values that are not optimized from the point of view of the emissivity. For this reason for example it is possible to prefer, for these systems considered separately on one glass sheet, an emissivity which is of the order of 0.03, whereas systems of the same type but with thicker silver layers result in emissivities of the order of 0.01.

Starting from a conventional triple glazing as represented in FIG. 2, by using the systems of layers presented above and comprising a silver layer such that the emissivity on a 4 mm clear glass sheet is 0.03, a thermal insulation coefficient, as indicated in example 1 of the table, of 0.6 W/m$^2$·K is obtained.

Figure 3:
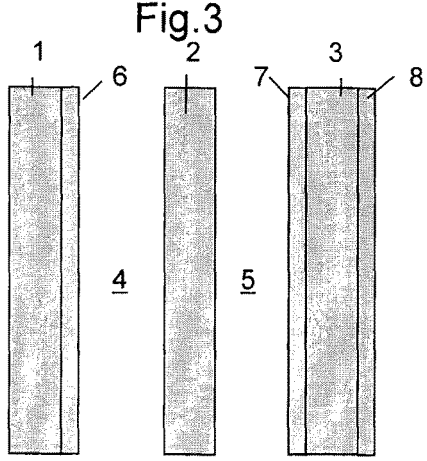
FIG. 3 is a view of a glazing according to the invention.

FIG. 3 represents a glazing according to the invention comprising a system of layers deposited by pyrolysis (8) on the outer face of the glazing turned toward the inside of the building.

The low emissivity systems of this type comprise a layer of doped tin oxide, deposited on a first layer having the role of neutralizing the color. The layer in contact with the glass is for example a layer of silicon oxycarbide. The layers of tin oxide, compared to the systems deposited by sputtering, are relatively thick, more than 200 nm, and for some of them more than 450 nm. These thick layers are strong enough to withstand being exposed. Unlike the layers deposited by sputtering, they are not necessarily enclosed in the spaces located between the glass sheets. Their performances as regards emissivity are much lower than those of the layers deposited by sputtering. The individual sheets bearing such layers have a U coefficient for the highest performing of the order of 0.15 or at best 0.10. For this reason, these systems of layers are not desired for glazings which must achieve extreme performances with the aid of these systems alone.

Glazings coated with pyrolytic layers that are particularly preferred comprise a system of pyrolytic layers, including an SiOxCy layer in contact with the glass and a layer of SnO$_2$ doped with fluorine (2 at % of the layer).

The triple glazing according to the invention presented in FIG. 3 simultaneously comprises three systems of layers. The high-performance pyrolytic layer consists of a layer of tin oxide doped with fluorine having a thickness of 470 nm. This layer rests on a layer of SiOxCy having a thickness of 75 nm. Individually, the emissivity of this system deposited on a 4 mm glass sheet is established at 0.10. The layers obtained by sputtering are the same as those indicated above with respect to FIG. 2.

The glass sheets, as above, have a thickness of 4 mm and are a distance of 16 mm apart from one another. The space between the sheets is filled with 90% argon.

By using these systems of layers in the products according to the invention comprising three glass sheets each having a thickness of 4 mm, a distance of 16 mm apart, the space being filled with 90% argon, it is possible to achieve a thermal transmission coefficient U, defined according to the EN 673 standard, of 0.50 W/m$^2$·K, with a light transmission of 61 as reported for example 2 in the table below.

The properties of the triple glazings according to the invention are sensitive to the thickness of the glass sheets used. The distance between these sheets is also a significant factor. Distances of 15 or 16 mm are practically those which exhibit the best compromise between the total thickness of the glazing and the insulating performance. Examples 3 and 4 reported in the table below are analogous to the preceding examples, 1 and 2. The only difference is the use of glass sheets, each of which has a thickness of 5.85 mm. For these examples the thermal performances are unchanged. The light transmission is a little lower due to the additional absorption corresponding to this greater thickness.

| Example | TL | Rext. | U |
|---------|----|-------|----|
| 1 | 69 | 17 | 0.6 |
| 2 | 61 | 18 | 0.5 |
| 3 | 66 | 17 | 0.6 |
| 4 | 59 | 18 | 0.5 |

The invention claimed is:

1. A triple building glazing comprising:
a glass sheet, wherein:
a first face of the glass sheet comprises a system of layers produced by sputtering and comprising an infrared-reflecting metal layer,
a second face of the glass sheet comprises a set of low-emissivity layers comprising an oxide layer deposited by gas pyrolysis, and
wherein,
the glazing has, for a 4 mm thick glass sheet, a light transmission which is not less than 60%,
the oxide layer is on a glass surface designed to face an inside of a building and the system of layers is on a face of the glass sheet facing an interior of the triple glazing,
the oxide layer has a surface roughness Ra of less than 10 nm,
the system of layers produced by sputtering comprises a silver-based layer having a thickness of between 10 and 15 nm.

2. The glazing of claim 1, wherein the glazing has a haze of less than 0.7%.

3. The glazing of claim 1, wherein the oxide layer comprises a layer of doped tin oxide doped with antimony or fluorine.

4. The glazing of claim 3, wherein at least one layer of SiOxCy, a set of layers of $TiO_2.SiO_2$, or a set of layers of $SnO_2.SiO_2$ is interposed between the glass sheet and the layer of doped tin oxide.

5. The glazing of claim 4, wherein the oxide layer has a thickness of not less than 200 nm.

6. The glazing of claim 1, wherein the set of low-emissivity layers deposited by gas pyrolysis is such that a 4 mm clear float glass sheet, coated with the set of low-emissivity layers, has an emissivity of at most 0.20.

7. The glazing of claim 1, wherein the system of layers produced by sputtering is such that a 4 mm sheet coated with the system of layers produced by sputtering has an emissivity of at most 0.01.

8. The glazing of claim 1, further comprising:
a second set of layers comprising an infrared-reflecting metal layer that is deposited by sputtering, wherein the second set is in glass surface position 2.

9. The glazing of claim 1, wherein a space between the glass sheets is filled with a gas having a low thermal conductivity.

10. The glazing of claim 9, wherein the gas comprises, at least 90%, of argon.

11. The glazing of claim 1, wherein the glazing has, in a CIELAB system, reflection colorimetric coordinates such that:

$-6 \le a^* \le 3$ $-6 \le b^* \le 3$.

12. The glazing of claim 1, wherein the glazing has a haze of less than 0.5%.

13. The glazing of claim 1, wherein the set of low-emissivity layers deposited by gas pyrolysis is such that a 4 mm clear float glass sheet, coated with the set of low-emissivity layers, has an emissivity of at most 0.15.

14. The glazing of claim 1, wherein the set of low-emissivity layers deposited by gas pyrolysis is such that a 4 mm clear float glass sheet, coated with the set of low-emissivity layers, has an emissivity of less than 0.10.

15. The glazing of claim 1, wherein the glazing has a U coefficient of at most 0.50.

16. A triple glazing comprising:
a first glass sheet;
a second glass sheet; and
a third glass sheet, wherein:
a first face 5 of the third glass sheet comprises a system of layers produced by sputtering and comprising an infrared-reflecting metal layer,
a second face 6 of the third glass sheet comprises a set of low-emissivity layers comprising an oxide layer deposited by gas pyrolysis, and
wherein,
the oxide layer is on the third glass sheet face 6 facing an exterior of the glazing and the system of layers is on the third glass sheet face 5 facing an interior of the triple glazing,
the oxide layer has a surface roughness Ra of less than 10 nm,
the system of layers produced by sputtering comprises a silver-based layer having a thickness of between 10 and 15 nm,
the glazing has a haze of less than 0.7%, and
the glazing has for a 4 mm thick glass sheet, a light transmission which is not less than 60%.

17. The glazing of claim 16, wherein the oxide layer comprises a layer of doped tin oxide doped with antimony or fluorine.

18. The glazing of claim 16, wherein at least one layer of SiOxCy, a set of layers of $TiO_2.SiO_2$, or a set of layers of $SnO_2.SiO_2$ is interposed between the third glass sheet and the layer of doped tin oxide.

19. The glazing of claim 16, wherein the set of low-emissivity layers deposited by gas pyrolysis is such that a 4 mm clear float glass sheet, coated with the set of low-emissivity layers, has an emissivity of at most 0.20.

20. The glazing of claim 16, wherein the glazing has, in a CIELAB system, reflection colorimetric coordinates such that:

$-6 \le a^* \le 3$ $-6 \le b^* \le 3$.

* * * * *